(12) United States Patent
Criel et al.

(10) Patent No.: US 9,358,742 B2
(45) Date of Patent: Jun. 7, 2016

(54) PROCESS FOR MANUFACTURING A PLASTIC FUEL TANK

(75) Inventors: Bjorn Criel, Sint-Martens-Lennik (BE); Vincent Cuvelier, Wuhan (CN); David Hill, Commerce Township, MI (US)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 194 days.

(21) Appl. No.: 14/111,076

(22) PCT Filed: Apr. 4, 2012

(86) PCT No.: PCT/EP2012/056235
§ 371 (c)(1),
(2), (4) Date: Dec. 4, 2013

(87) PCT Pub. No.: WO2012/139961
PCT Pub. Date: Oct. 18, 2012

(65) Prior Publication Data
US 2014/0110038 A1    Apr. 24, 2014

Related U.S. Application Data

(60) Provisional application No. 61/474,427, filed on Apr. 12, 2011, provisional application No. 61/490,053, filed on May 25, 2011.

(30) Foreign Application Priority Data

May 10, 2011    (EP) .................................... 11165495

(51) Int. Cl.
*B29D 22/00*    (2006.01)
*B29C 49/20*    (2006.01)
(Continued)

(52) U.S. Cl.
CPC .............. *B29D 22/003* (2013.01); *B29C 51/12* (2013.01); *B29C 51/267* (2013.01); *B29C 49/04* (2013.01);
(Continued)

(58) Field of Classification Search
CPC ............... B29C 2049/2008; B29C 2049/2013; B29C 2049/2065; B29C 2049/2047; B29C 2049/2078; B29C 51/12; B29D 22/003; B29L 2031/7172
See application file for complete search history.

(56) References Cited

U.S. PATENT DOCUMENTS 6,338,420 B1 *    1/2002    Pachciarz et al. ............. 220/562
2002/0125254 A1    9/2002    Hagano et al.
(Continued)

FOREIGN PATENT DOCUMENTS

CN    101080310 A    11/2007
DE    102 39 187 A1    3/2004
(Continued)

OTHER PUBLICATIONS

Combined Office Action and Search Report issued Mar. 24, 2015 in Chinese Patent Application No. 201280018087.4 (with English Translation of Category of Cited Documents).
(Continued)

*Primary Examiner* — William Bell
(74) *Attorney, Agent, or Firm* — Oblon, McClelland, Maier & Neustadt, L.L.P.

(57) ABSTRACT

A process for manufacturing a fuel tank, including: inserting a plastic parison including two distinct parts into an open two-cavity mold; inserting a core inside the parison, the core including two parts of a reinforcing element capable of securing two different locations inside the parison; pressing the parison firmly against the mold cavities; fixing the two reinforcing element parts at the two locations of the parison using the core; withdrawing the core; closing the mold, bringing its two cavities together to grip the two parison parts around their periphery to weld them together; injecting a pressurized fluid into the mold and/or creating a vacuum behind the mold cavities to press the parison firmly against the mold cavities; opening the mold and extracting the tank; making an opening into the tank wall; and through the opening, putting at least a third reinforcing element part to link/connect the two first parts together.

13 Claims, 13 Drawing Sheets

(51) Int. Cl.
*B29C 51/12* (2006.01)
*B29C 51/26* (2006.01)
*B60K 15/03* (2006.01)
*B29C 49/04* (2006.01)
*B29C 49/00* (2006.01)
*B29K 23/00* (2006.01)
*B29K 709/08* (2006.01)
*B29L 31/00* (2006.01)

(52) U.S. Cl.
CPC . *B29C 2049/0057* (2013.01); *B29C 2049/2008* (2013.01); *B29C 2049/2047* (2013.01); *B29C 2049/2065* (2013.01); *B29C 2049/2078* (2013.01); *B29C 2791/001* (2013.01); *B29C 2793/009* (2013.01); *B29C 2793/0081* (2013.01); *B29K 2023/065* (2013.01); *B29K 2023/086* (2013.01); *B29K 2623/065* (2013.01); *B29K 2709/08* (2013.01); *B29L 2031/7172* (2013.01); *B60K 15/03177* (2013.01)

(56) References Cited

U.S. PATENT DOCUMENTS

| | | | |
|---|---|---|---|
| 2004/0129708 A1* | 7/2004 | Borchert et al. | 220/562 |
| 2008/0061470 A1* | 3/2008 | Borchert et al. | 264/250 |
| 2009/0250458 A1 | 10/2009 | Criel et al. | |
| 2011/0131789 A1 | 6/2011 | Pohlmann et al. | |
| 2012/0006476 A1 | 1/2012 | Criel et al. | |
| 2012/0037638 A1 | 2/2012 | Criel et al. | |

FOREIGN PATENT DOCUMENTS

| WO | 2006 064004 | 6/2006 | |
|---|---|---|---|
| WO | WO 2006/064004 A1 | 6/2006 | |
| WO | 2008 003387 | 1/2008 | |
| WO | 2010 023212 | 3/2010 | |
| WO | WO 2010046496 A2 * | 4/2010 | |
| WO | 2010 122065 | 10/2010 | |
| WO | WO 2010122065 A1 * | 10/2010 | |

OTHER PUBLICATIONS

European Search Report Issued Jun. 27, 2012 in Application No. 11 16 5495 Filed May 10, 2011.

International Search Report Issued Jul. 16, 2012 in PCT/EP12/056235 Filed Apr. 4, 2012.

* cited by examiner

PROCESS FOR MANUFACTURING A PLASTIC FUEL TANK

The present invention relates to a process for manufacturing a plastic fuel tank with improved creep resistance.

Plastic fuel tanks intended for motor vehicles have to meet specifications that specify maximum permissible amplitudes of deflection on their lower skin. The deflections stated in these specifications usually have to be met during ageing tests in which the tank contains a certain quantity of fuel for a given period of time (typically several weeks) and at temperature (usually 40° C.). The purpose of these specifications is to ensure that vehicles maintain their road clearance and to prevent the skin of the tank from coming into contact with hotspots of the vehicle.

At the present time, plastic fuel tanks are generally fixed to the chassis of the vehicle via plastic lugs and are supported by metal straps. The latter are used in particular on the more capacious tanks where compliance with maximum permissible deflections is more difficult. However, recourse to these straps involves an additional attachment step and is therefore not very economical.

Moreover, hybrid vehicles and particularly cars operating in electric mode only, are characterized by a significant reduction of the volumes of air for purging the canister. In the context of the development of fuel systems for applications of this type, a pressurization of the tank is envisaged, since the generation of petrol vapours decreases as a function of the pressure. At pressures of 350 to 450 mbar, vapour generation is almost eliminated. Thus the canister is no longer affected by changes in the surrounding temperature. On the other hand, the mechanical strength/creep resistance of the tank must be increased since the deformations resulting from the pressurization are added to the deformations induced by the weight of the fuel.

Solutions have been proposed in the prior art with a view to enhancing the mechanical strength (including the creep resistance) of fuel tanks.

Thus, patent application WO 2006/064004 in the name of the Applicant describes a method for manufacturing a plastic fuel tank with improved creep resistance, according to which:
a) a plastic parison comprising two distinct parts is inserted into an open two-cavity mould;
b) a core is inserted inside the parison, said core bearing at least part of a reinforcing element capable of securing (creating a link between) the two parts of the parison;
c) the parison is pressed firmly against the mould cavities (by blowing through the core and/or creating suction behind the cavities);
d) (the part of) the reinforcing element is fixed to at least one of the parts of the parison using the core;
e) the core is withdrawn;
f) the mould is closed again, bringing its two cavities together in such a way as to grip the two parts of the parison around their periphery in order to weld them together;
g) a pressurized fluid is injected into the mould and/or a vacuum is created behind the mould cavities in order to press the parison firmly against the mould cavities;
h) the mould is opened and the tank is extracted.

Patent application WO 2008/003387 describes a similar solution. In one embodiment thereof, the reinforcing element is in fact in 4 parts: 2 holders which are fixed on the parison, and 2 connecting parts fixed to said holders and which have complementary parts so as to be linked together when the mould closes.

An improvement of this concept was proposed in patent application WO 2010/122065 to the Applicant, according to which the reinforcing element comprises a hollow plastic pillar having an opening in its lower part and an opening in its upper part, these openings being situated at locations such that they allow, respectively, the filling of the pillar and the degassing thereof, at least one part of the hollow pillar being a constitutive element of an accessory that has an active role in the tank.

In all three applications, the reinforcing elements may be (or is) in two complementary parts which are assembled when or after the mold is closed for welding the two parts of the parison together step f) described above.

However, in certain cases, it is not possible or not the purpose to have the links in the direction of the mould closing, which makes it impossible to integrate a reinforcing part into the tank during the blow moulding process. Besides, when the reinforcing parts are intended to integrate an active accessory of the tank (like the swirl pot of the pump/gauge module), it might be easier (and advantageous economically) to be able to only integrate said active accessory to the tank after its moulding, while fixing most of its containment to the tank during molding, for reducing mounting costs.

The present invention aims at solving these problems by providing a process allowing to fix reinforcing elements, active or not, during the moulding of the tank, whatever the orientation of said elements versus the mould closing direction and also allowing the easy integration of an active component inside a reinforcing structure.

To that end, the present invention relates to a process for manufacturing a fuel tank having a plastic wall, according to which:
1. a plastic parison comprising two distinct parts is inserted into an open two-cavity mould;
2. a core is inserted inside the parison, said core bearing two parts of a reinforcing element capable of securing (creating a link between) two different locations inside the parison;
3. the parison is pressed firmly against the mould cavities (generally by blowing through the core and/or creating suction behind the cavities);
4. the two parts of the reinforcing element are fixed at the two locations of the parison using the core;
5. the core is withdrawn;
6. the mould is closed again, bringing its two cavities together in such a way as to grip the two parts of the parison around their periphery in order to weld them together;
7. a pressurized fluid is injected into the mould and/or a vacuum is created behind the mould cavities in order to press the parison firmly against the mould cavities;
8. the mould is opened and the tank is extracted;
9. an opening is made into the tank wall; and
10. through said opening, at least a third part of the reinforcing element is put in place in order to link/connect the two first parts together.

The term "fuel tank" is understood to mean an impermeable tank that can store fuel under diverse and varied environmental and usage conditions. Examples of such tanks are those with which motor vehicles are equipped.

The fuel tank according to the invention has a wall (defining an internal closed storage volume) made of plastic, that is to say made of a material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers.

One polymer often employed is polyethylene. Excellent results have been obtained with high-density polyethylene (HDPE). Preferably, the tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel. The present invention is particularly useful for HDPE tanks including an EVOH layer.

The tank according to the invention is provided with a reinforcing element which connects two different locations of its wall. This element is by definition rigid, i.e. over the life of the tank, it does not deform (at least in the direction perpendicular to the tank walls) by more than a few mm, ideally it deforms by less than 1 mm.

Said reinforcing element may have any shape: it may be a hollow pillar as described above; it may be a plane piece having the overall shape of a rod; it may be a kind of hollow body functioning as a swirl pot or pump module casing etc. The invention gives good results with reinforcing pillars as described above i.e. with cylindrical structures comprising a centre that has a given cross section and two ends on both sides of this centre that generally have larger cross sections. Preferably, said hollow pillars are active ones i.e. they perform at least one active function (like venting, storing etc) in the fuel tank: see WO 2010/122065 to the Applicant, the content of which is incorporated by reference to the present application.

According to the invention, the reinforcing element comprises at least 3 parts: two first ones being fixed to the parison while molding the tank from the parison, and a third one being used for linking the 2 former ones together, generally mechanically by clipping or any other type of quick connection implying preferably complementary parts in relief.

According to the invention, the two first parts of the reinforcing element are fixed at 2 different locations of the parison's inner surface, generally being located opposite to each other, on two parts of the wall facing each other, but which may be located on the same parison part. Any fixation method may be used to that end but preferably, it is welding and/or rivet snapping (see application WO 2006/008308 in the name of the applicant, the content of which is incorporated by reference to the present application).

The two first parts of the reinforcing element which are fixed to the parison may merely be fixation parts or patches having a substantially flat shape but comprising a portion in relief allowing the third part (or the other parts of the reinforcing element) to be easily fixed to it, for instance by a "quick connect" type connection. Alternatively, the two first parts may constitute the major part of said reinforcing element and the third part (or the next parts) merely is a mechanical fixation part like a clip for instance.

The aforementioned parts of the reinforcing element are based on any fuel-resistant plastic and, if the 2 first parts are welded to the tank, they are preferably based on a plastic compatible with that of the tank (at least at the surface).

Virgin HDPE or HDPE filled with glass fibers or any other type of filler (natural or polymeric fibers), POM, PEEK, etc. may be suitable. Preferably, they are plastic parts manufactured by injection moulding.

According to the invention, the parison is in two parts or sheets which may have been manufactured separately or which may be the result of the cutting open of a tubular parison along two opposite generatrixes thereof.

According to the invention, the parison in two parts is moulded in a mould comprising two cavities having their inner surface adapted to the outer surface of the tank, and a core that makes it possible to attach the two first parts of the reinforcing element to said parison.

The term "core" is understood to mean a part of a size and a shape suitable for being inserted between the mould cavities and preventing the two parts of the parison from being welded together during the first mould closing. Such a part is described, for example, in Patent GB 1,410,215, the content of which is, for this purpose, introduced by reference into the present application.

According to the invention, once the tank has been demoulded and cooled, an opening is made into its wall. Preferably, this opening later on serves as service or sender opening, which is the opening through which the component(s) of the tank which are serviceable (like the pump/gauge module for instance) are introduced and fixed inside the tank.

According to the invention, through said opening, at least a third part of the reinforcing element is put in place in order to link/connect the two first parts together.

There are 2 preferred ways to realize this connection:
by manual or (semi)automatic introduction of at least a third, intermediate part into the tank and by connection of it between the 2 first parts previously attached to the inner tank surface
by release of a (semi)automatic locking mechanism being part of at least one of the 2 previously attached parts, so as to engage both parts together.

According to a preferred embodiment, the process of the invention is used to fix several reinforcing elements into the tank which are perpendicular and linked to each other so as to form a cage. This allows not only to reach a very rigid structure but also, to stabilize heavy components into the tank like the pump/gauge module (or fuel sender unit) for instance.

According to another preferred embodiment, the reinforcing element is a clip in two parts each comprising a hole and a protuberance. This embodiment allows to balance the bending stress in the 2 other parts of the reinforcing element.

As explained above, one particular area that is of concern is the area of the fuel sender unit where relative distance between the top and the bottom of the tank is critical to proper fuel pickup and gauging. Although the solutions set forth above can work in some circumstances, there are nevertheless specific cases in which they can lead to problems owed to the fact that the top and bottom of the tank are not parallel due to:
blow moulding tolerances;
deformations during part cooling;
deformations during thermal expansion;
deformations of tank shells not identical in top and bottom tank surface;
a specific non-parallel design of the top surface and the bottom surface of the tank.

In these cases, a traditional clipping apparatus tends to concentrate stresses into localized regions of the interface. More specifically, since no movement between the 2 opposite tank surfaces is allowed (this design not allowing any misalignment of the linked surfaces), all stresses are taken by the reinforcing element which in certain cases could create some stress concentrations.

It is hence preferable to design the contention in such a way it allows a better distribution of the stresses without increasing the tank deformation while under pressure. To achieve this, according to a preferred embodiment of the invention, there is provided at least one rotating link in the reinforcing element so as to distribute stresses evenly. The idea behind this embodiment is that any freedom of movement in all directions except the direction into which the deformation must be limited (which would be induced by pressure variations inside the tank) could allow a reduction of the stresses. Hence, by "rotating link" is meant a point of articulation allowing the reinforcing element to bend. Hence, the distance between the two tank walls can only be reduced (at least significantly speaking) and not be significantly greater than the length of the reinforcing element when it is straight (not bended). In addition it should be noted that elements will generally be added to limit the overall articulation to a level that is above the general manufacturing tolerances, but still limiting to the deflection of the tank in the opposite direction. It is worth noting that this "articulated" embodiment can be used for reinforcing purposes only i.e. not in the specific area of the fuel sender unit.

The rotating link described above also gives an advantage during a high impact test by allowing some movement of the opposite tank sides and thus limiting stresses in the reinforcement structure and the tank shell. These limited stresses reduce the risk of fuel leakage at high impact energy and makes the assembly also more resistant to the handling drop (reduced risk of contention break).

In this "articulated" embodiment, the two first parts of the reinforcing element (those which are fixed to the tank wall) can have any shape.

In a preferred embodiment, they have the shape of flat struts. In that embodiment, the at least third part of the reinforcing element preferably comprises a clip in 2 parts comprising deformable elements to as to allow some movement of the parts relative to each other.

In another preferred embodiment, the two first parts of the reinforcing element have the shape of (preferably hollow) cylindrical struts or rods. In that embodiment, the at least third part of the reinforcing element preferably comprises at least one part able to constitute, together with the struts or with parts attached thereto, a universal joint. A universal joint, universal coupling, U joint, Cardan joint, Hardy-Spicer joint, or Hooke's joint is a joint or coupling in a rigid rod that allows the rod to 'bend' in any direction, and is commonly used in shafts that transmit rotary motion. It generally consists of a pair of hinges located close together, oriented at 90° to each other, connected by a cross shaft.

The objective of FIGS. 1 to 14 is to illustrate certain concrete aspects of the invention, without wishing to restrict the scope thereof in any way.

In FIGS. 1 to 4, the following numerical references designate the following elements:
1: fuel tank shell
2: pinch line of the fuel tank (i.e. weld line of the two pre-moulded parison parts)
3: part 1 of the reinforcing element
4: part 2 thereof
5: connection part
6: latch
7: spring.

Figure 1:
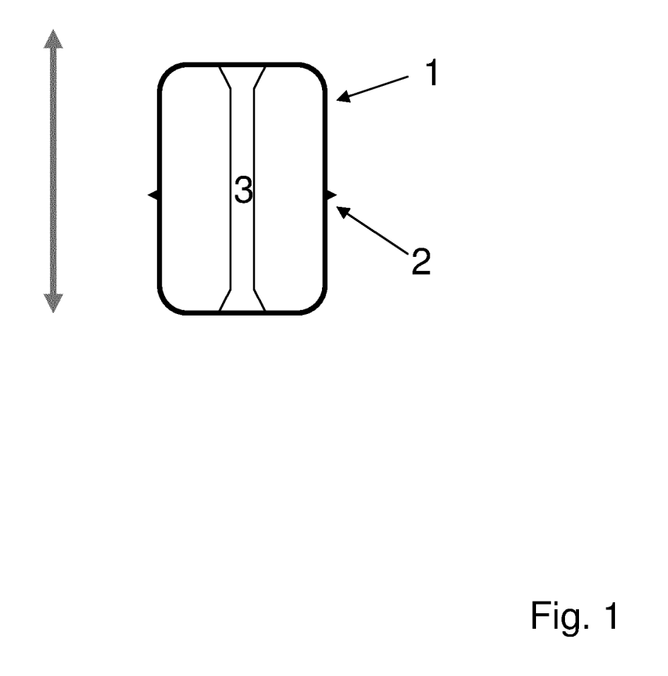
FIGS. 1 and 2 show embodiments with a reinforcing pillar in one piece (not in accordance with the present invention)

FIG. 1 shows (on a tank cross-section) a reinforcing element in one part, that can be fixed during tank moulding as known from prior art since it is aligned along the mould closing direction (indicated by an arrow).

Figure 2:
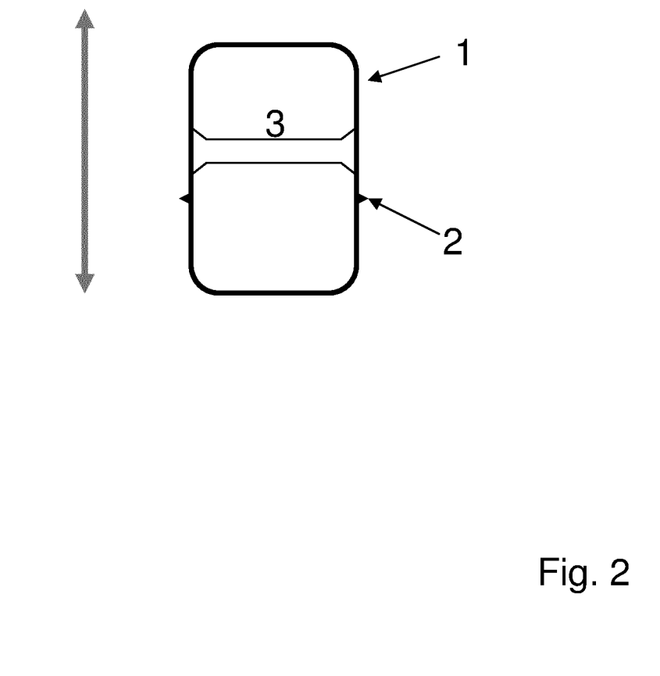

FIG. 2 illustrates (also on a tank cross-section) the situation where the link between tank walls is perpendicular to the mould closing direction (again indicated by an arrow), so that a one part reinforcing element cannot be fixed during tank moulding as in prior art.

Figure 3:
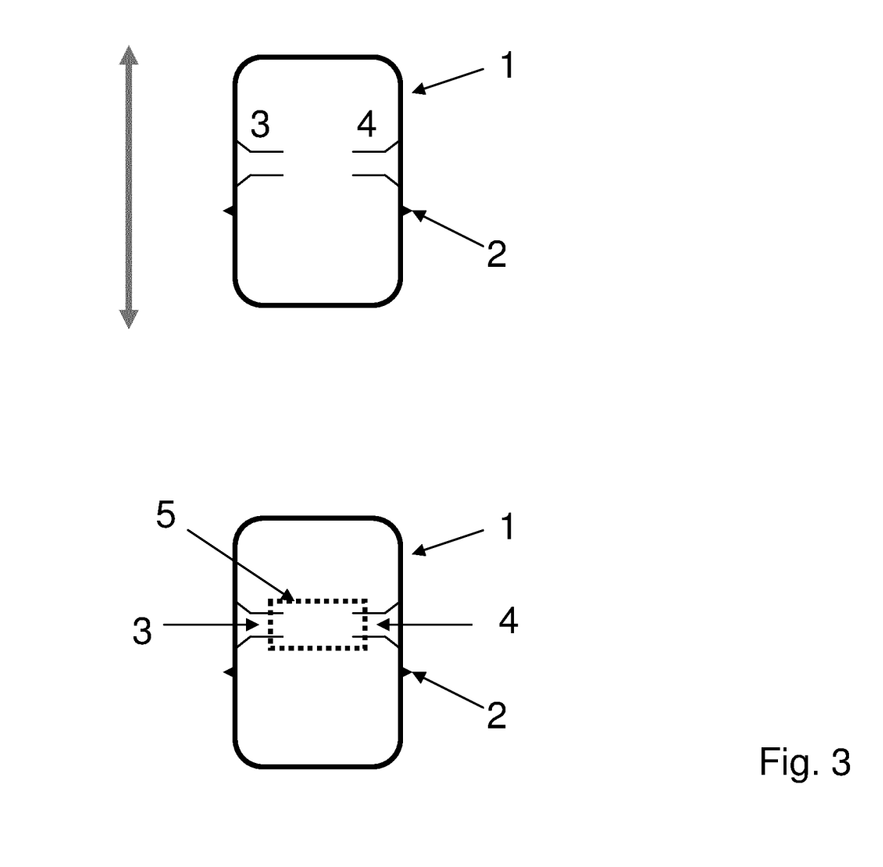
FIGS. 3 and 4 show two different embodiments involving a reinforcing pillar according to the invention.

FIG. 3 illustrates the concept of the invention with a reinforcing element in 3 parts (3, 4, 5), two of which (3, 4) being assembled during tank moulding (as can be seen on the tank cross section above) an the third one being fixed thereto (as can be seen in the tank cross section below) by action through the sender unit hole (not shown)—which is the only hole available in the tank for a low permeation solution—in order to link the 2 first parts thereof. This assembly process can be either manual, semi automatic (using a specific tool but manually driven) or fully automatic.

Figure 4:
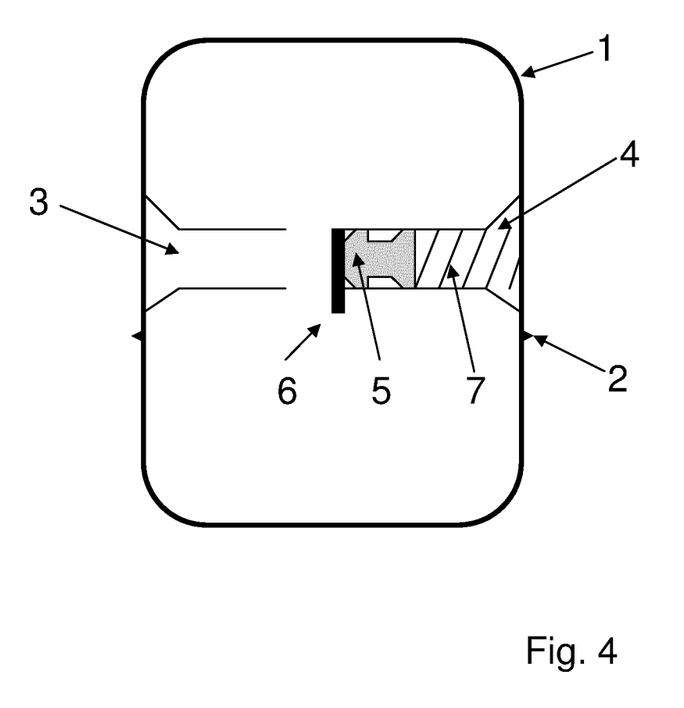

FIG. 4 illustrates an embodiment based on the following process steps:
introduce two pillar parts (3, 4) during the blow moulding
make sender unit opening (not shown)
remove a latch (6) allowing a spring mechanism (7) to push a connection part (5) integrated into one of the two pillar parts (3, 4) into its final position.

In this embodiment, the third part of the reinforcement element is integrated to one of the 2 first parts (3, 4) and it is moved/released manually or (semi)automatically after tank cooling and demoulding by mechanical action through the sender unit hole.

Figure 5:
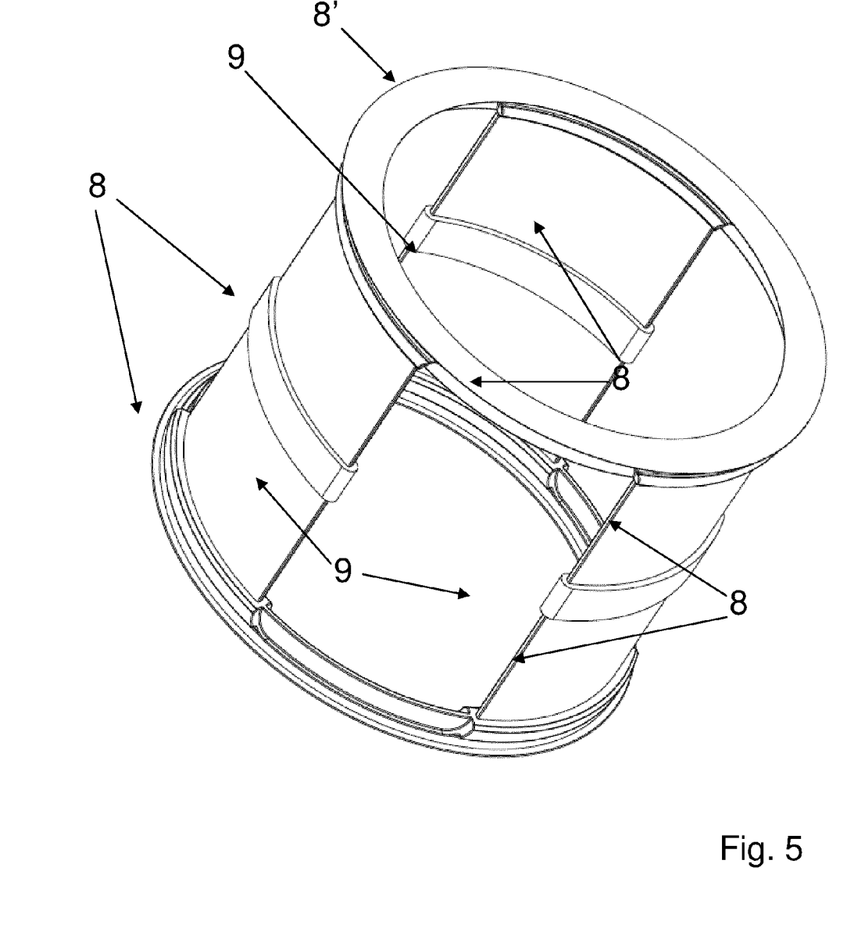
FIG. 5 shows a way of fixing/containing the fuel sender module according to an embodiment of the invention.

The invention can also be applied directly to the module contention (or swirl pot surrounding the pump/gauge module). In this case, the final link between top and bottom could consist out of different assembled sections. This alternative is represented in FIG. 5, which shows:
the two parts (8) fixed during moulding and which comprise a weld interface (8') for welding on the inner tank skin
parts (9) clipped trough a sender unit hole (not shown) made after tank cooling and demoulding.

As can be seen from this embodiment, there may be more than one part linking the first and second parts of the reinforcing element together.

Figure 6:
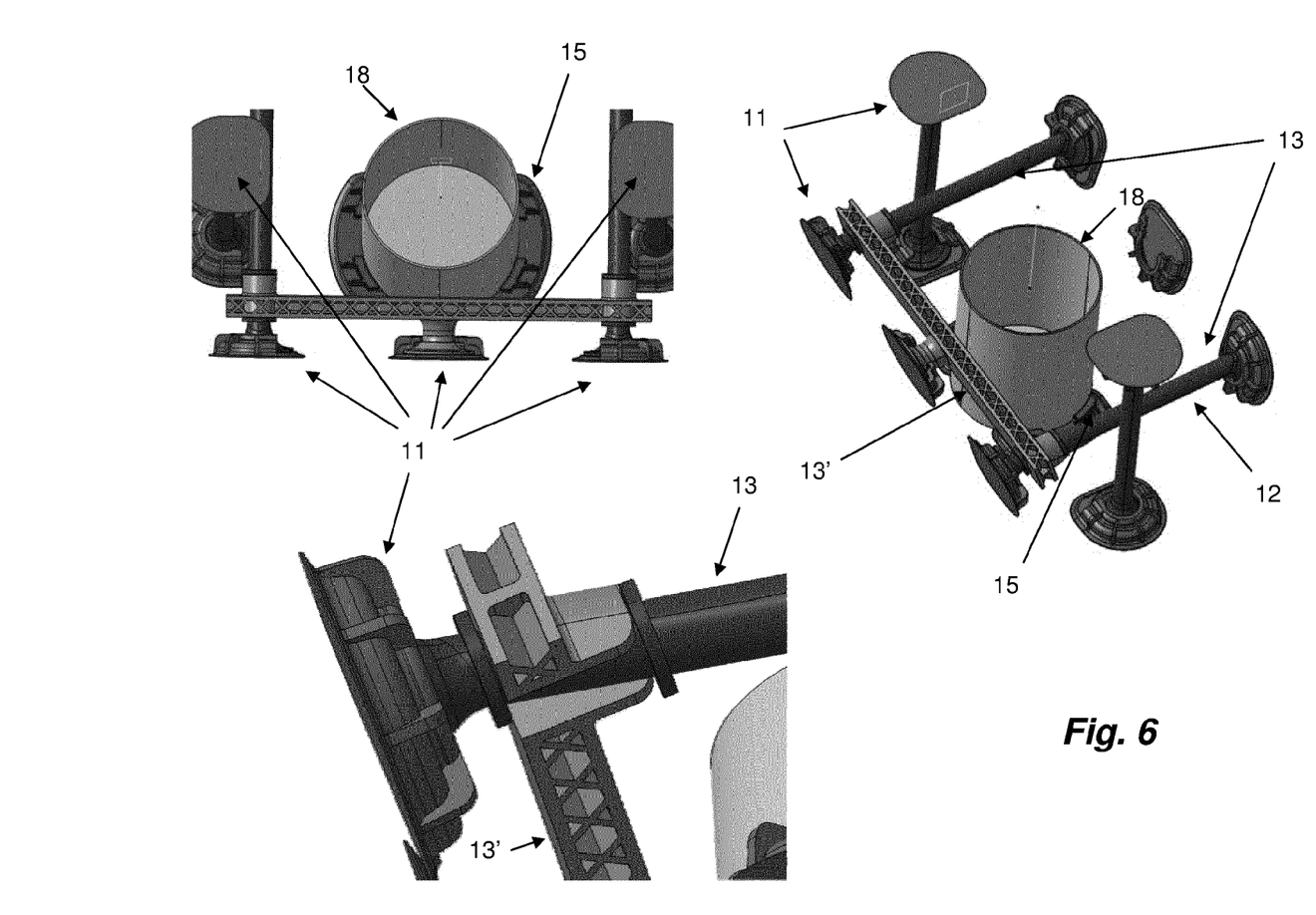
FIG. 6 shows another embodiment of fuel sender containment.
Figure 7:
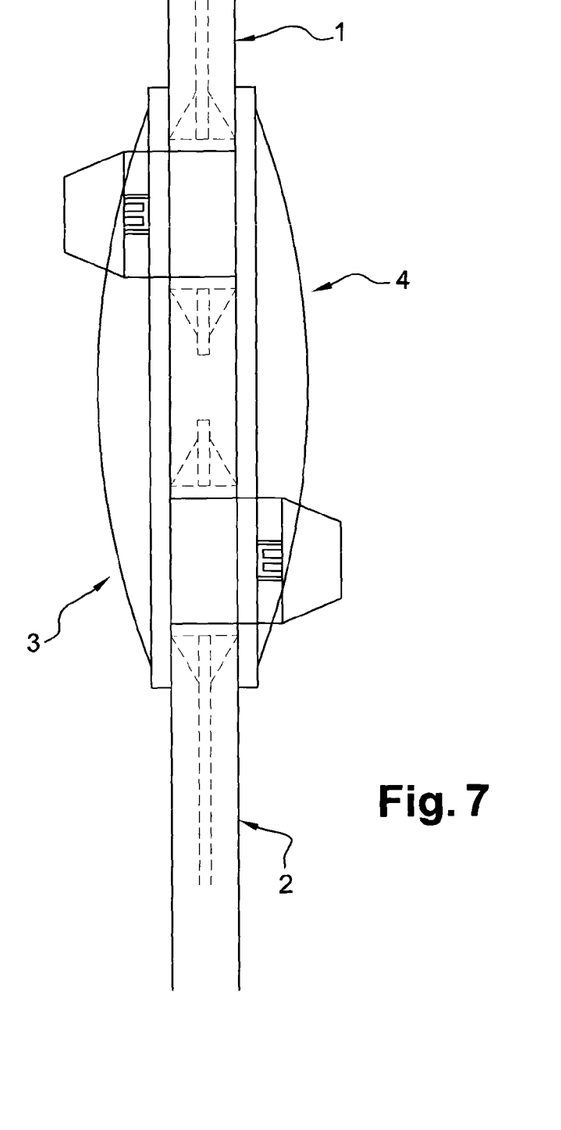
FIG. 7 shows an embodiment of reinforcing element involving a clips in 2 parts rigidly fixed one to the other.

In FIG. 6, another embodiment of the invention is depicted. In this embodiment, multiple reinforcing elements are used comprising each 3 parts, namely: 2 patches (11) fixed to the parison during molding, and vertical or horizontal rods (12, 13, 13') fixed to them and linked together so as to constitute a kind of cage. This cage is used to assist the fixation and stabilize a fuel sender module (18) fixed through a fuel sender unit hole (not shown) to a bottom patch (15), said fuel sender unit hole being afterwards closed by a plate using a seal and a locking collar (not shown). In this embodiment, the patches (11, 15) were fixed to the parison during moulding while the rods (12, 13, 13') and the sender module (18) were fixed to these elements through the hole which has been machined through the tank wall. This embodiment allows to stabilize the deformation and by this potential module inclination which might induce gauging errors In FIG. 7, still another embodiment is shown, in which the at least a third part of the reinforcing element is a clip in two parts (3, 4) that balances the bending stress in the two first parts of the reinforcing element (1, 2). Each of these first parts (1, 2) comprises a hole through which a protuberance of each of the parts of the clip (3, 4) is inserted, which is afterwards fitted into a corresponding portion in relief in the other part of the clip (4, 3), where it remains fixed by clipping.

Figure 8:
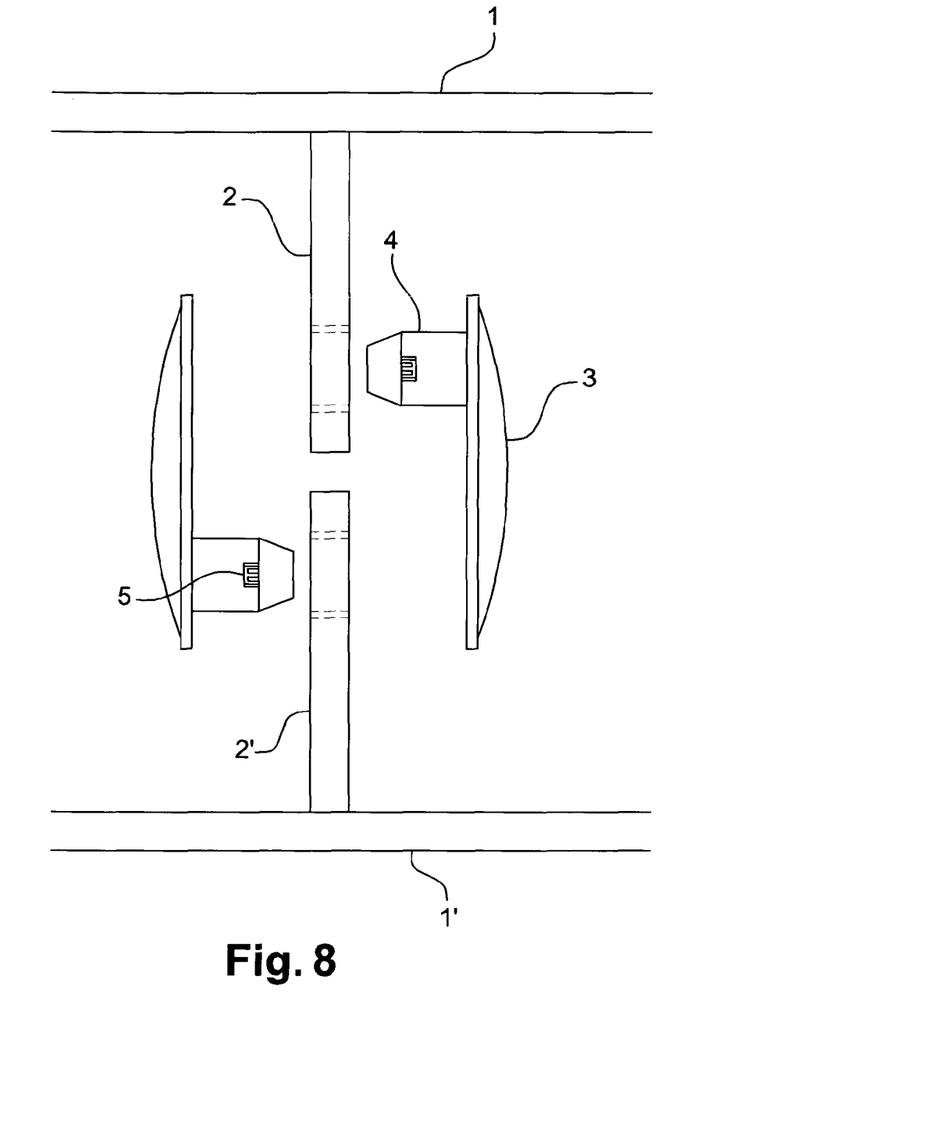
FIGS. 8 to 14 show preferred embodiments of the invention involving reinforcing elements with an articulation/rotating link, FIGS. 8 and 9 showing two different views of one embodiment of such a reinforcing elements, FIGS. 10 and 11 showing a solution using it in practice, FIGS. 12 and 13 showing another embodiment of "articulated" reinforcing element and FIG. 14, still another embodiment thereof.
Figure 9:
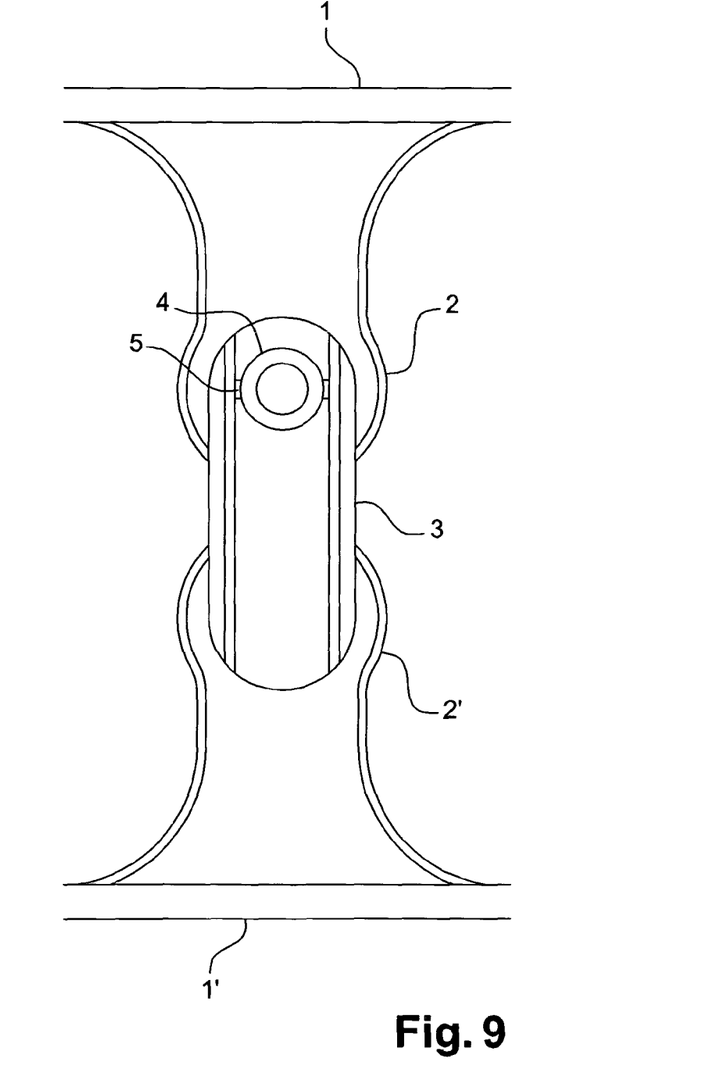

FIGS. 8 and 9 show 2*d* views (respectively a side view with the clips open and a front view with the clips closed) of another embodiment also involving a clip in several parts but this time, involving a rotational link (articulation). In these figures, the upper and lower portions of the tank are represented by 1 and 1' respectively. Connected to the upper and lower tank portions (1,1') are strut assemblies (2, 2') which are connected to the top or the bottom of the tank (1,1') via a mechanical lock or a fusion welding process or a combination of the two. To connect the upper and lower struts (1,1') together, use is made of an intermediate clip (3) containing a hole on the lower side of the part (not visible on these figures) and a post (4) on the upper side of the part, designed to pass through the lower strut assembly (1'), and mate with another intermediate clip of the same geometry, but rotated 180 degrees to mate with the first clip (3). The clips are retained to each other via a bayonet style mechanism involving deformable tabs (5), and they connect the upper and lower strut assemblies (2,2') together restricting the upper and lower tank sections (1'1') from moving relative to one another. The tabs (5) deform to allow the post (4) to be pushed through the holes and then spring back to retain the parts together, allowing however some freedom of movement between said parts thanks to the deformability of the tabs.

The primary advantages of this embodiment reside in:

a. The assembly process, as shown in these figures. In the case that the tank sections (1,1') and the strut assemblies (2,2') are misaligned due to shrinkage in the blow moulding process for instance, there is still the possibility to assemble the pieces, as long as the distance between the centers of the holes in the upper and lower strut assemblies (1,1') stay relatively close to that of the distance of the centerlines of the hole and the post on the clips.

b. The distribution of stress. Since the design is circular, it allows for the stress resulting in the increase or decrease of distance between the upper and lower tank sections (1,1') to be distributed evenly across the mating surface of the clips and better distributed from the holes in the strut assemblies (2,2') to the tank surfaces (1,1') via the body of the strut assemblies (2,2')

c. The very low stress concentration on the clips itself when the fuel tank is under pressure allowing to combine a clipping operation with low force (needed in practice) combined with a good pressure resistance. Moreover, in this design, the clipping direction is perpendicular to the force transmission in the reinforcement structure.

Figure 10:
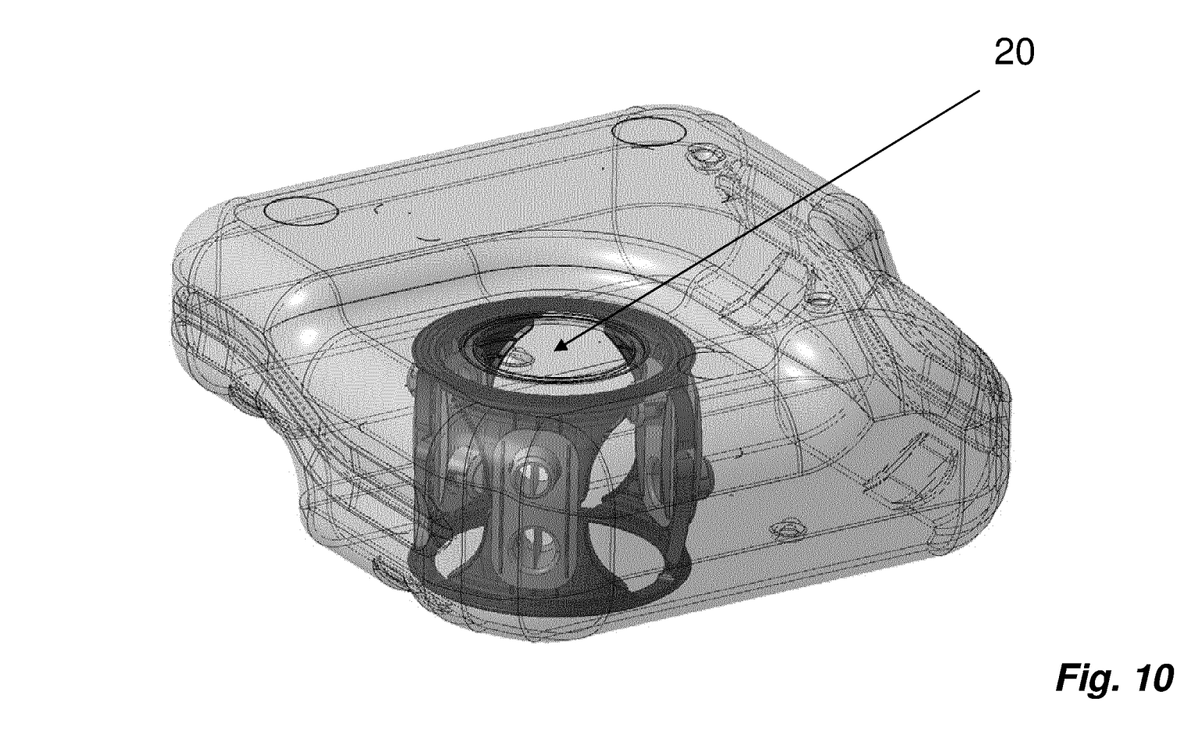
Figure 11:
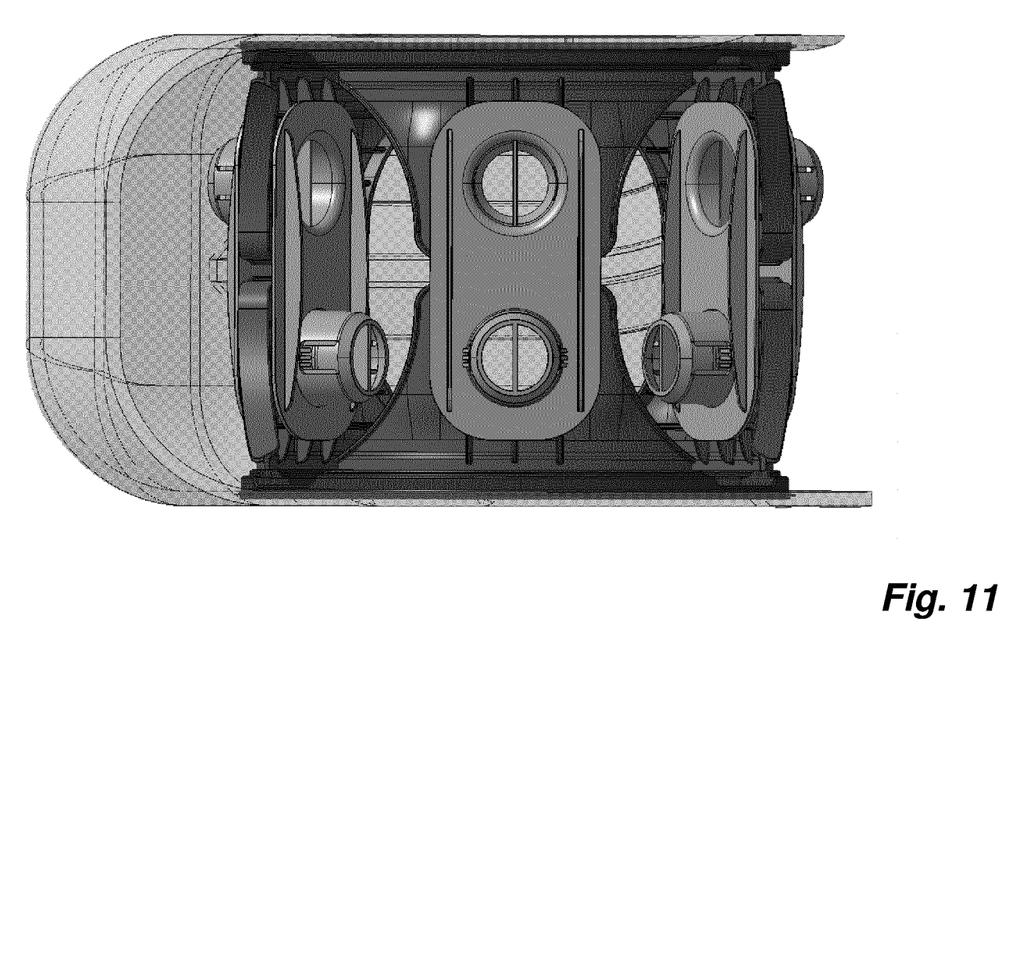

FIG. 10 depicts a 3d version of one embodiment of the invention using such struts and clips for containing a fuel sender unit and FIG. 11 shows another view of the same embodiment.

In this embodiment, there are 3 connections/reinforcing elements displaced around a module opening (20), however the size of the interface, the number of connections rotated around a given diameter and the size of said diameter can vary depending on the location within a tank shell.

Figure 12:
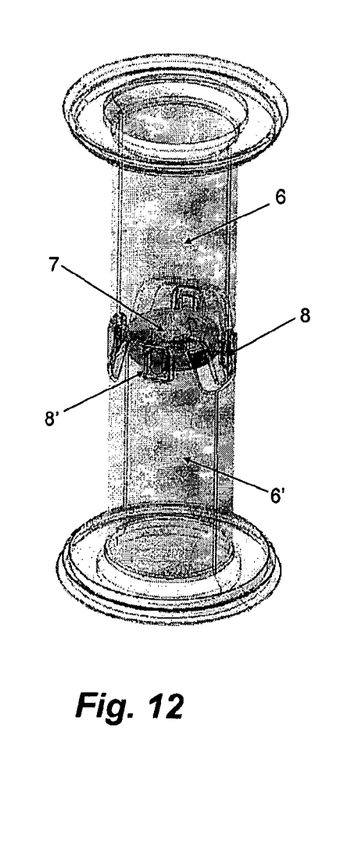

FIG. 12 depicts another embodiment of the invention that uses a joint similar to that of the universal joint as mentioned in the text above. In this case the upper and lower strut assemblies would be cylindrical in shape.

Figure 13:
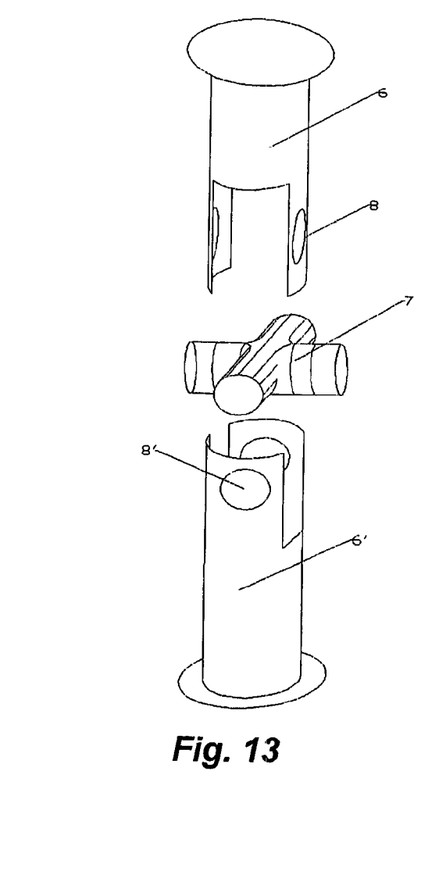

FIG. 13 depicts an exploded view of the above embodiment (of FIG. 12). In this figure, the upper and lower cylindrical strut assemblies are made to be connected to the tank surface as in the previous embodiment (1,1'). Holes are included (8,8') in the cylindrical strut assemblies (6,6') to accept a cross shaped locking fitting (7) which serves as a means of connecting the strut assemblies (6,6') to each other, while allowing some rotational misalignment between the two, thus distributing the loads more equally as in the previous embodiment. The assembly process between the strut assemblies (6,6') and the cross shaped locking fitting could range from an interference fit to the insertion of the member and additional retention components added after insertion. This is somewhat depending on the application and time of assembly relative to the blow molding process. For example, the material displaced around the holes (8,8') could be designed to flex in order to accept the intermediate piece (7). In another embodiment not pictured, the intermediate piece could for instance be fit in small cups similar in construction to a modern day universal joint used on a prop shaft for a motor vehicle.

Figure 14:
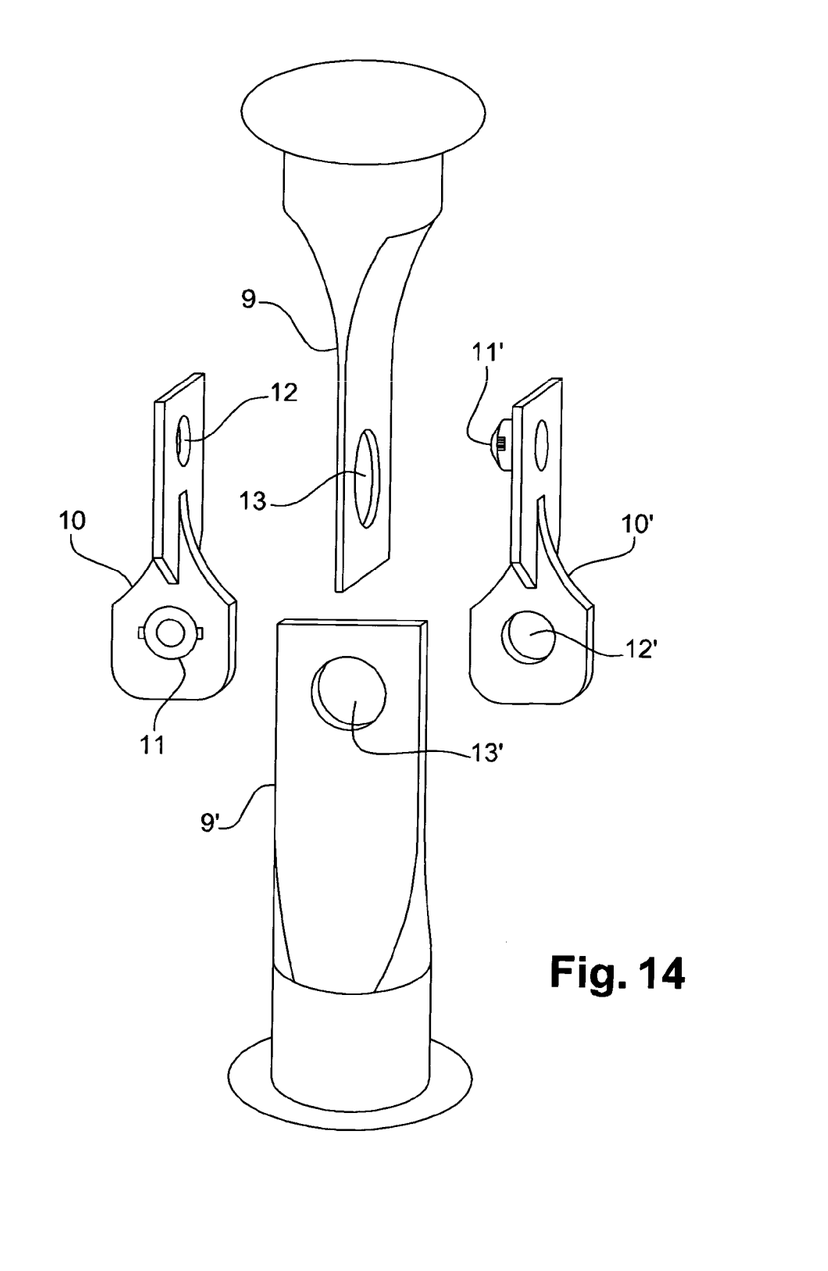

FIG. 14 displays an exploded view of yet another embodiment of the invention. In this embodiment, the upper and lower struts (9,9') are identical pieces rotated 90° from each other. Intermediate clips (10,10') are used to retain the two struts (9,9') together. The intermediate clips (10,10') are assembled by inserting the post (11) of the intermediate clip (10) through the hole of the strut (13') and then through the hole in the intermediate clip (12'). The two intermediate clips are then rotated about the axis of the lower strut hole (13') towards each other and the post (11') is pushed through the hole in the upper strut (13) and then through the hole in the intermediate clip (12). The intermediate clips (10,10') preferably would be attached to one of the struts, prior to blow molding of the tank to avoid the need to reach through the fuel tank sender opening with parts in hand to install to the strut (9') before connecting the two.

The invention claimed is:

1. A process for manufacturing a fuel tank having a plastic wall, comprising:
    a) inserting a plastic parison comprising two distinct parts into an open mold that includes two cavities;
    b) inserting a core inside the parison, the core bearing two parts of a reinforcing element to secure two different locations inside the parison;
    c) firmly pressing the parison against the two cavities;
    d) fixing the two parts of the reinforcing element at the two locations of the parison using the core;
    e) withdrawing the core;
    f) closing the mold, bringing the two cavities together in such a way as to grip the two parts of the parison around their periphery to weld them together;
    g) injecting a pressurized fluid into the mold and/or creating a vacuum behind the mold cavities to press the parison firmly against the two cavities;
    h) opening the mold and extracting the tank;
    i) making an opening into the wall of the tank; and
    j) through the opening, putting a third part of the reinforcing element in place to connect the two parts of the reinforcing element together,
    wherein the two parts of the reinforcing element constitute a majority of the reinforcing element and the third part of the reinforcing element is a mechanical fixation part.

2. A process according to claim 1, wherein the reinforcing element has a shape of a hollow pillar.

3. A process according to claim 1, wherein the two different locations are on two parts of the wall facing each other and are on a same parison part.

4. A process according to claim 1, wherein the two parts of the reinforcing element are fixed to the parison by at least one of welding and rivet snapping.

5. A process according to claim 1, wherein at least one component of the tank which is serviceable is introduced and fixed inside the tank through the opening.

6. A process according to claim 1, wherein j) comprises: manual or semiautomatic introduction of at least an intermediate part into the tank and connection of the at least intermediate part between the two parts previously attached to the inner tank surface.

7. A process according to claim 1, wherein the third part of the reinforcing element is a clip in two parts each comprising a hole and a protuberance.

8. A process for manufacturing a fuel tank having a plastic wall, comprising:
   a) inserting a plastic parison comprising two distinct parts into an open mold that includes two cavities;
   b) inserting a core inside the parison, the core bearing two parts of a reinforcing element to secure two different locations inside the parison;
   c) firmly pressing the parison against the two cavities;
   d) fixing the two parts of the reinforcing element at the two locations of the parison using the core;
   e) withdrawing the core;
   f) closing the mold, bringing the two cavities together in such a way as to grip the two parts of the parison around their periphery to weld them together;
   g) injecting a pressurized fluid into the mold and/or creating a vacuum behind the mold cavities to press the parison firmly against the two cavities;
   h) opening the mold and extracting the tank; and
   i) making an opening into the wall of the tank,
   wherein the reinforcing element is a hollow pillar, the process further comprising removing a latch allowing a spring mechanism to push a connection part integrated into one of two pillar parts into a final position, inside an other pillar part.

9. A process for manufacturing a fuel tank having a plastic wall, comprising:
   a) inserting a plastic parison comprising two distinct parts into an open mold that includes two cavities;
   b) inserting a core inside the parison, the core bearing two parts of a reinforcing element to secure two different locations inside the parison;
   c) firmly pressing the parison against the two cavities;
   d) fixing the two parts of the reinforcing element at the two locations of the parison using the core;
   e) withdrawing the core;
   f) closing the mold, bringing the two cavities together in such a way as to grip the two parts of the parison around their periphery to weld them together;
   g) injecting a pressurized fluid into the mold and/or creating a vacuum behind the mold cavities to press the parison firmly against the two cavities;
   h) opening the mold and extracting the tank;
   i) making an opening into the wall of the tank; and
   j) through the opening, putting a third part of the reinforcing element in place to connect the two parts of the reinforcing element together,
   wherein plural reinforcing elements are fixed that are perpendicular and linked to each other to form a cage.

10. A process for manufacturing a fuel tank having a plastic wall, comprising:
    a) inserting a plastic parison comprising two distinct parts into an open mold that includes two cavities;
    b) inserting a core inside the parison, the core bearing two parts of a reinforcing element to secure two different locations inside the parison;
    c) firmly pressing the parison against the two cavities;
    d) fixing the two parts of the reinforcing element at the two locations of the parison using the core;
    e) withdrawing the core;
    f) closing the mold, bringing the two cavities together in such a way as to grip the two parts of the parison around their periphery to weld them together;
    g) injecting a pressurized fluid into the mold and/or creating a vacuum behind the mold cavities to press the parison firmly against the two cavities;
    h) opening the mold and extracting the tank;
    i) making an opening into the wall of the tank; and
    j) through the opening, putting a third part of the reinforcing element in place to connect the two parts of the reinforcing element together,
    wherein the reinforcing element comprises at least one rotating link or articulation allowing the reinforcement element to bend.

11. A process according to claim 10, wherein the reinforcing element is used in an area of a fuel sender unit.

12. A process according to claim 10, wherein the two parts of the reinforcing element have a shape of flat struts, and wherein the third part of the reinforcing element comprises a clip in two parts comprising deformable elements.

13. A process according to claim 10, wherein the two parts of the reinforcing element have a shape of cylindrical struts or rods, and wherein the third part of the reinforcing element comprises at least one part configured to constitute, together with the struts or with parts attached thereto, a universal joint.

* * * * *